United States Patent [19]
Hoffmann et al.

[11] 3,768,115
[45] Oct. 30, 1973

[54] ANTI-RATTLE BUSHING

[75] Inventors: Donald R. Hoffmann, Wayne; Stephen L. Reed, Detroit, both of Mich.

[73] Assignee: Ford Motor Company, Dearborn, Mich.

[22] Filed: June 14, 1971

[21] Appl. No.: 152,640

[52] U.S. Cl.......................... 16/2, 248/56, 174/53 G
[51] Int. Cl.............................................. B65d 7/48
[58] Field of Search .................... 16/2, 108; 248/56; 339/103 B, 126 RS; 287/93; 85/80; 151/141.75; 174/53 G; 308/238; 29/141, 73 PM; 74/490

[56] References Cited
UNITED STATES PATENTS

| | | | |
|---|---|---|---|
| 3,231,300 | 1/1966 | Moroney.............................. | 287/93 |
| 3,243,835 | 4/1966 | Armentrout et al.............. | 24/141 X |
| 1,487,978 | 3/1924 | Schaar et al...................... | 287/93 X |
| 3,415,155 | 12/1968 | Riddell et al................... | 308/238 X |
| 3,099,057 | 7/1963 | Cook .......................... | 174/153 G X |
| 2,850,333 | 9/1958 | Hamman........................ | 308/238 X |
| 3,209,614 | 10/1965 | Prescott............................ | 287/93 X |

FOREIGN PATENTS OR APPLICATIONS

| | | | |
|---|---|---|---|
| 741,059 | 8/1966 | Canada................................... | 24/73 |

*Primary Examiner*—James T. McCall
*Assistant Examiner*—Peter A. Aschenbrenner
*Attorney*—John R. Faulkner et al.

[57] ABSTRACT

A molded plastic anti-rattle bushing adapted to prevent metal to metal contact between an apertured lever arm and an actuator rod having a shepherd's crook end portion. The bushing is received within the lever arm aperture and in turn has a bore that receives the actuator rod end portion. At one end, the bushing has an annular flange with an upstanding lip adapted to resiliently space the actuator rod from the lever arm. At the other end, the bushing is provided with resilient fingers radially collapsible inwardly to facilitate insertion of a pilot portion through the lever arm aperture and radially deflectable outwardly to facilitate insertion of the actuator rod through the bushing bore.

1 Claim, 4 Drawing Figures

PATENTED OCT 30 1973
3,768,115
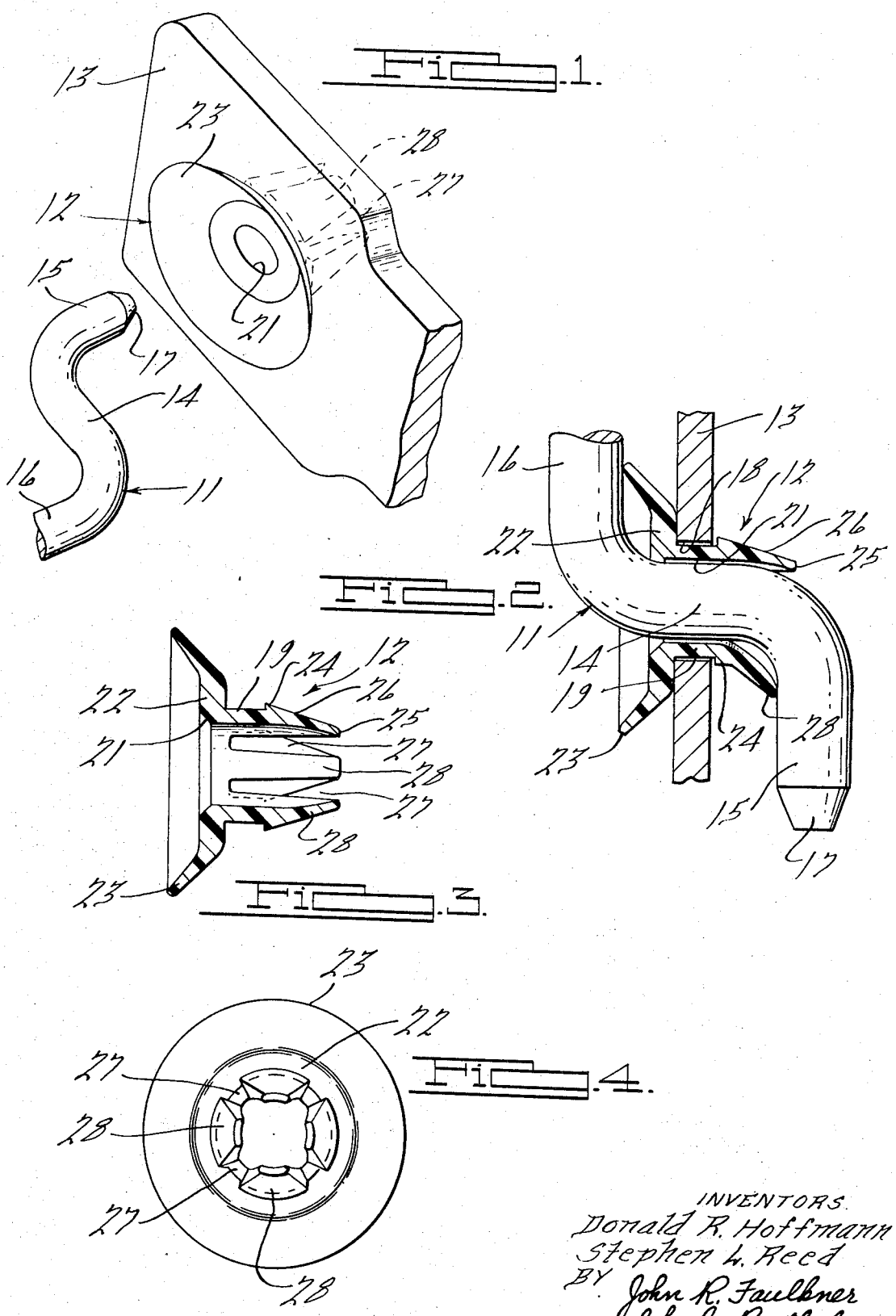
INVENTORS.
Donald R. Hoffmann
Stephen L. Reed
BY John R. Faulkner
John J. Roethel
ATTORNEYS

ANTI-RATTLE BUSHING

BACKGROUND OF THE INVENTION

One of the quickest ways to couple an actuator rod to a lever arm, particularly when the two devices are adapted for movement in substantially parallel planes, is to provide the rod with a shepherd's crook end portion which is inserted through an aperture in the lever arm. The shepherd's crook end portion comprises a short right angled end portion of the rod which terminates in a further right angle portion, which further portion extends substantially parallel to the main body portion of the rod. The shepherd's crook end portion is hooked trough the lever arm aperture and forms a simple connection effective to transmit movement of the actuating rod to the lever arm.

The aperture in the lever arm is slightly larger in diameter than the diameter of the actuator rod in order to accommodate the rounded corners of the shepherd's crook portion as the latter is threaded through the aperture. This loose fit can be a source of rattling sounds, particularly when such a connection is used in automotive vehicle components. The object of the present invention is to provide a simple and inexpensive anti-rattle bushing which eliminates metal to metal contact between the actuator rod and the lever arm.

SUMMARY OF THE INVENTION

The present invention relates to a molded plastic anti-rattle bushing adapted to prevent metal to metal contact between a lever arm and an actuator rod coupled thereto. The bushing is particularly adapted for use in a situation in which the lever arm has an aperture and the actuator rod has a shepherd's crook end that passes through the aperture. The bushing comprises a cylindrical body for axial insertion into the lever arm aperture and has an axial bore through which the shepherd's crook end of the actuator rod is to be inserted. The bushing body has an enlarged annular flange at one end having an upwardly inclined lip portion adapted to resiliently space the actuator rod from the lever arm. The body further has a step shoulder portion spaced from the other end effective to prevent withdrawal of the bushing from the lever arm in a direction opposite the direction of insertion. The tapered pilot portion extending from the stepped shoulder portion to the other end facilitates insertion of the body through the lever arm aperture. The body has a plurality of open ended slots extending axially from the end of the pilot portion into the stepped shoulder portion and terminating subjacent the annular flange.

The plastic material between the slots forms resilient fingers radially collapsible inwardly to facilitate insertion of the pilot portion to the lever arm aperture and radially deflectable outwardly to facilitate insertion of the shepherd's crook end of the actuator rod through the bushing bore.

DESCRIPTION OF THE DRAWING

Other objects, advantages and features of the present invention will be made more apparent as this description proceeds, reference being had to the accompanying drawing, wherein:

FIG. 1 is an exploded perspective view of the terminal end of an actuator rod, a fragmentary portion of a lever arm and the anti-rattle bushing embodying the present invention;

FIG. 2 is a side elevation in part sectional of the components shown in FIG. 1 in assembled relationship;

FIG. 3 is a vertical sectional view of the anti-rattle bushing embodying the present invention; and FIG. 4 is an enlarged bottom view of the bushing shown in FIG. 3.

DETAILED DESCRIPTION OF THE INVENTION

Referring now to FIG. 1, there is shown in disassembled relationship a fragmentary portion of an actuator rod 11, a bushing 12 and a fragmentary portion of a lever arm 13, the bushing 12 being preassembled to the lever arm 13.

The actuator rod 11 has what is known as a shepherd's crook end portion. This consists of a right angled bend 14 terminating in a further right angled bend 15 which substantially parallels the main portion 16 of the rod 11. The terminal end 15 has a chamfered tip 17. The actuator rod 11 is of the type frequently used as a force transmitting or operating link between a door handle assembly (not shown) such as is found on an automobile door, and a lever arm, represented by the lever arm 13, of a latch mechanism (not shown) mounted within the door. The lever arm 13 is provided with an aperture 18.

It has been the practice to couple an actuator rod, such as the rod 11, to a lever arm 13 simply by inserting the shepherd's crook end 15 of the rod into the aperture 18 in the lever arm 13. Then, with a slight twist, the rod 11 is aligned with the lever arm 13 in the relationship shown in FIG. 2. Any movement of the rod 16 in a plane substantially parallel to the plane of the lever arm 13 results in swinging movement of the lever arm about its pivot axis.

One particular objection to this simple rod to lever connection is the metal to metal contact between the rod and the lever arm. A motor vehicle is subject to many vibratory forces and the metal to metal contact between the loosely connected rod and lever arm could be a source of undesirable rattling sounds. The present invention relates to a simple molded plastic anti-rattle bushing adapted to prevent such metal to metal contact between the lever arm and the actuator rod.

The molded plastic anti-rattle bushing, hereinabove generally designated 12, comprises a cylindrical body 19 adapted to be axially inserted into the aperture 18 of a lever arm 13. The cylindrical body 19 has an axial bore 21 through which the shepherd's crook end of the actuator rod 11 is adapted to be inserted. At one end, the bushing body has an enlarged annular flange 22 having an upwardly inclined continuous lip portion 23. Intermediate its ends, the body has a stepped shoulder portion 24 of a diameter slightly larger than the diameter of the aperture 18 in the lever arm 13. From the stepped shoulder portion 24 to the end 25 opposite the flanged end, the body has a tapered pilot portion 26 to facilitate its insertion through the lever arm aperture 18.

The body of the bushing has a plurality of slots 27 extending axially from the body end 25 through the stepped shoulder portion and terminating subjacent the annular flange. The plastic material between the slots 27 forms resilient fingers 28 that are radially collapsible inwardly to facilitate insertion of the pilot portion 26 through the lever arm aperture 18. The fingers 28 are radially deflectable outwardly (See FIG. 2) to facilitate insertion of the shepherd's crook end of the actuator rod through the bore 21 of the bushing 12.

In use, the anti-rattle bushing 12 is preferably preassembled to the lever arm 13 by inserting the pilot portion 26 into the aperture 18 in the arm. Moderate pressure applied in an axial direction will cause the anti-rattle bushing to be snapped into the aperture where it is retained by the space relationship of the annular flange 22 and the shoulder portion 24. The tapered end 16 of the actuator rod 11 is then inserted into the axial bore 21 of the anti-rattle bushing 12 as indicated in FIG. 1. After being inserted to the full length of the right angled end portion 15, the actuator rod must then be swung 90 degrees to achieve the relationship shown in FIG. 2. The actuator rod shepherd's crook end is then held against lateral movement relative to the lever arm 13 by the abutting portion of the rod body portion 16 with the annular flange lip 23 and the abutting relationship of the rod end 15 with the resilient fingers 28. As will be readily apparent, the actuator rod end is fully insulated from metal to metal contact with the lever arm 13 by the cylindrical body of the anti-rattle bushing 12.

It will be understood that the invention is not to be limited to the exact construction shown and described but that various changes and modifications may be made without departing from the spirit and scope of the invention as defined in the appended claims.

We claim:

1. A molded plastic anti-rattle bushing adapted to prevent metal to metal contact between a lever arm and an actuator rod coupled thereto, the lever arm having an aperture and the actuator rod having a shepherd's crook end, the bushing comprising a cylindrical body for axial insertion into the lever arm aperture and having an axial bore through which the shepherd's crook end of the actuator rod is inserted, the bushing body having:

a. an enlarged annular flange integral with and encircling the cylindrical body at one end and having a resilient and continuous lip portion on the periphery of said flange inclined outwardly and away from said of said cylindrical body adapted to resiliently space the actuator rod from the lever arm in all positions of the latter during relative movement between the actuator rod and the lever arm, b. a stepped shoulder portion spaced from the other end effective to prevent withdrawal of the bushing body from the lever arm in a direction opposite to the direction of insertion, c. a tapered pilot portion extending from the stepped shoulder portion to the other end, d. a plurality of open-ended slots extending axially from the end of the pilot portion through the stepped shoulder portion and terminating subjacent the annular flange, and e. the body between the slots forming resilient fingers radially deflectable inwardly to facilitate insertion of the pilot portion through the lever arm aperture and radially deflectable outwardly to facilitate insertion of the shepherd's crook end of the actuator rod through the bushing bore.

* * * * *